US00RE39095E

(19) United States
(12) Reissued Patent
Friedman

(10) Patent Number: US RE39,095 E
(45) Date of Reissued Patent: May 16, 2006

(54) KNITWEAR HAVING NO CURL COLLARS

(76) Inventor: Marc Friedman, 10820 NW. 12th Pl., Plantation, FL (US) 33322

(21) Appl. No.: 10/335,530

(22) Filed: Dec. 31, 2002

Related U.S. Patent Documents

Reissue of:
(64) Patent No.: 6,167,732
Issued: Jan. 2, 2001
Appl. No.: 09/476,809
Filed: Jan. 3, 2000

(51) Int. Cl.
*D04B 9/42* (2006.01)

(52) U.S. Cl. ..... 66/173; 66/170; 2/132; 223/84

(58) Field of Classification Search ..... 66/173, 66/170, 169 R, 172 R, 190; 2/132, 134, 255; 223/84
See application file for complete search history.

(56) References Cited

U.S. PATENT DOCUMENTS

| | | | | |
|---|---|---|---|---|
| 1,105,407 | A | * | 7/1914 | Curtis |
| 2,769,976 | A | | 11/1956 | Driesbach |
| 2,769,979 | A | * | 11/1956 | Driesbach ..... 2/132 |
| 3,286,278 | A | * | 11/1966 | O'Connor |
| 3,832,737 | A | | 9/1974 | Podosky |
| 4,038,840 | A | * | 8/1977 | Castello |
| 4,286,337 | A | * | 9/1981 | Malouf, Jr. |

* cited by examiner

*Primary Examiner*—Danny Worrell
(74) *Attorney, Agent, or Firm*—Laurence A. Greenberg; Werner H. Stemer; Ralph E. Locher

(57) ABSTRACT

For a selected collar stay, i.e., 0.375 inches in width, for a shirt knitted with selectively sized wales, i.e., 0.10 inches in width, a pocket for the stay also knitted but with selectively narrower wales, i.e., 0.025 inches in width, so that predictably a number of wales, i.e., 14 in number, produces a width of the pocket approximately equal to the width of the stay to minimize movement of the stay within the pocket.

18 Claims, 1 Drawing Sheet

KNITWEAR HAVING NO CURL COLLARS

Matter enclosed in heavy brackets [ ] appears in the original patent but forms no part of this reissue specification; matter printed in italics indicates the additions made by reissue.

The present invention relates generally to improvements for collar-attached shirts made of machine knitted fabric, the improvements; more particularly, enhancing the appearance of stays and their ability to function in providing a neat and tidy shirt collar.

EXAMPLE OF THE PRIOR ART

It is known by common experience that while it is desired to wear an open collar shirt of knitted fabric construction material at different times because it is particularly comfortable to wear, the somewhat casual appearance afforded by its inhibits its use on occasions when a somewhat tidier appearance is desired. One reason for this is the collar which by virtue of being made of knitted fabric tends to lay irregularly and does not look neat and tidy.

Prior U.S. Pat. No. 3,286,278 for "Knitwear Articles Having Collars" issued to [R.] *T.* R. O'Connor on Nov. 22, [1996] *1966* directly addresses this problem and proposes as a solution inserting plastic stays in cooperating pockets strategically located at the edges of the collar which bound the front neck opening of the shirt. Using stay-embodying techniques, as disclosed in numerous prior patents, as exemplified by U.S. Pat. No. 4,286,337 for "Shape Retaining Collar Devices and Articles Of Wearing Apparel Using Same" issued to Malouf, Jr. on Sep. 1, 1981, O'Connor's knitted collar has pockets with a widthwise dimension that is oversized with respect to the width of the plastic stay so that, following prior art practice of the noted '337 and other such patents, O'Connor can instruct a user that the stay is easily inserted into the pocket due to the sliding clearance resulting from the width oversizes of the pocket relative to the stay.

Unavoidably however, the sliding clearance permits shifting movement of the stay within the pocket, which detracts from the appearance of the knitted collar, and is vulnerable to the stay being protected through the interstices of the wales and courses of the knitted construction, as well as resulting in other undesirable consequences.

SUMMARY OF THE INVENTION

Broadly, it is an object of the present invention to provide a knitted collar with embodied plastic stays overcoming the foregoing and other shortcomings of the prior art.

More particularly, it is an object to use to advantage the operating mode of the knitting apparatus to match the width of the pocket stay to the width of the stay so that there is an optimum minimal size difference therebetween, all as will be better understood as the description proceeds.

The description of the invention which follows, together with the accompanying drawings should not be construed as limiting the invention to the example shown and described, because those skilled in the art to which this invention appertains will be able to devise other forms thereof within the ambit of the appended claims.

Method aspects of the present invention, as will be better understood as the description proceeds, is concerned with the manufacture of a knit shirt with an open collar during which a body of the collar is knit and a pocket for a plastic stay is knit adjacent the opening of the collar and proposes the improvement consisting of a method of matching the width sizes of the plastic stay and pocket to contribute to snugly holding in place a plastic stay inserted in the pocket.

Figure 1:
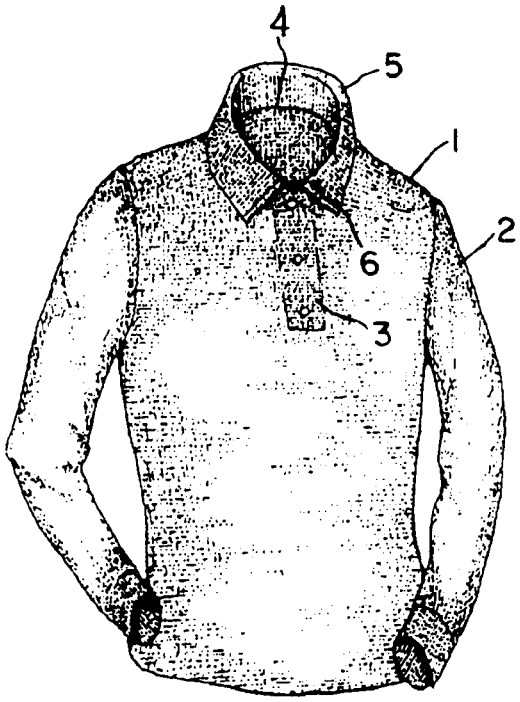
FIG. 1 is a front view of a garment according to the present invention.

An outer-garment made of knitted material is shown in FIG. 1 and comprises a body portion 1 having sleeves 2, a neck opening 4 with a collar 5 around the opening and provided with a button to closure strip 3 to fasten the collar securely around the neck of a wearer but which permit the larger diameter of the head to pass freely through the neck opening when open.

Figure 2:
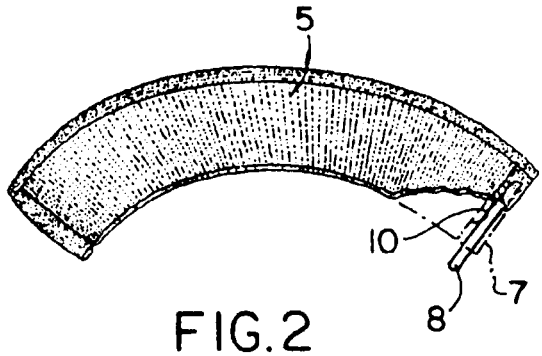
FIG.2 PRIOR ART
FIG. 2 is a detailed part perspective view of a collar according to prior art.

The collar 5 *has two selvedges (to the left and right of the collar 5 as viewed in FIGS. 2 and 3), a finished edge (at a top as viewed in FIGS. 2 and 3) and a sewing edge (at a bottom as viewed in FIGS. 2 and 3),* is of rib knitted material 5 and is formed as a rectangular strip which is then secured around the neck opening by a sewing machine *along the sewing edge.*

The collar 5 has a transverse pocket 7 formed at each *selvedge or* end into which is inserted a strip of stiffened material or stay 8. The pocket 7 is formed during the knitting of the collar and has one end closed and the other left open so that the stay 8 can be inserted. The open end is then closed when the collar is sewn around the neck opening of the garment.

The stay 8 may be of any convenient material as for example, bone or synthetic plastic material.

The collar can be produced on any type of machine having two needle beds, the needles being operated for producing the rib fabric of any desired rib formation.

The collar 5 is knitted with the wales of the knitted material 5 extending widthwise of the collar in which event the pockets 7 will be formed on a few needles at the selvedges.

It is already known, as illustrated and described in U.S. Pat. No. [4,386,278]*3,286,278* for ["knitwear] *"Knitwear* Articles Having Collars" issued to O'Connor et al. on Nov. 22, [1999] *1966* that this type of shirt, being made of knitted fabric, is very soft and flexible particularly suitable for casual wear and that the addition of the stays 8 to the collar, as proposed in the '278 patent and illustrated in FIG. 2, so improve the appearance of the shirt that it can be worn on many occasions when this type of shirt without stiffened collars would not generally be worn.

While generally effective for the purpose intended, the '278 patented pocket and stay construction 7, 8, presumably to provide sliding clearance 10 to facilitate insertion of the stay 8 into the pocket 7, unavoidably cannot restrain during wearing of the FIG. 1 garment shifting movement to the extent permitted by the clearance 10 of the stay 8 within the pocket 7.

As a solution to this shortcoming, and underlying the present invention is the recognition that during knitting, it is known that the width size of the wales can be varied, and that this operational mode can be used to advantage to eliminate an excessive sliding clearance 10, and consequently that the widths of the stay 8 and its cooperating pocket 7 can be matched so that for all practical purposes they are nearly identical or, at the worst, the pocket width is only slightly oversized with respect to the width of the stay 7.

Figure 3:
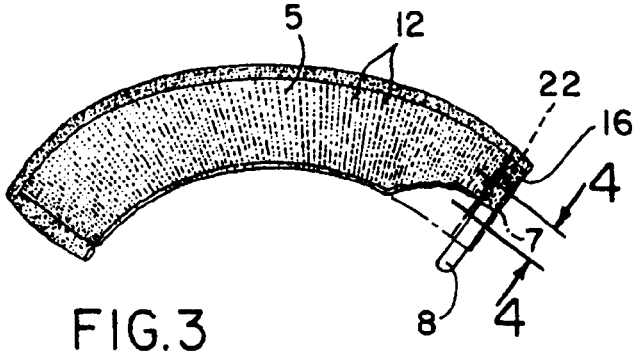
FIG. 3 is a detailed part perspective of a collar according to the present invention.
Figure 4:
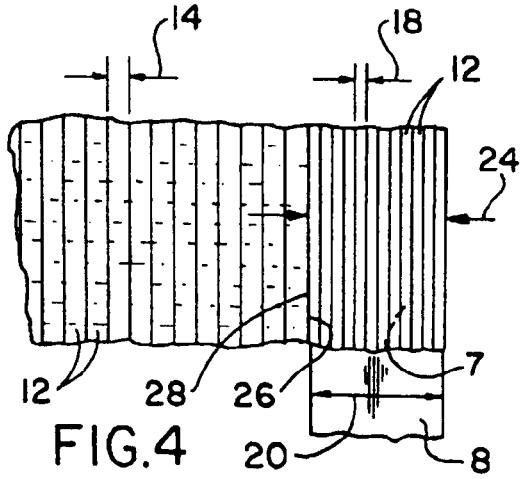
FIG. 4 is a detailed part perspective view, in an enlarged scale, of the portion of the collar delineated by the arrows 4--4 of FIG. 3.

As best shown in FIGS. 3 and 4, the collar body 5 is knitted with wales, individually and collectively designated 12, of a relatively large uniform width 14 providing a total of approximately 5 wales per ½ of an inch, which in practice results in optimum drapability and hand, i.e., characteristic touch, desirable for fashion requirements. In the area adjacent the collar edge 16 bounding the neck opening 4, the selected wales 12 are of a reduced width 18 providing a total 20 wales per ½ of an inch, and serve as the stay pocket 7. In knitting parlance the selected width of a wale is typically referred to as "stitch density". In the example provided good results have been achieved using a stitch density of 1 to 4, or a stay collar wale width that is ¼ the wale width using in the knitting of the collar body 5. Consequently the widths 20, 24 of the stay 8 and pocket 7 are of matching sizes or dimensions, which obviates any clearance resulting in the pocket 7 being oversized in relation to the width size 20 of the stay 8. Assuming unavoidable knitting variation in the width of the pocket wales 12, due to non-uniformity in the production of successive wales, the edge 26 of a reduced wales' width 24 might fall short of extending beyond the far edge 28 of the stay 8, and thus another wale 12 is required to make up for this mismatch, it is necessary to merely embody an additional wale width 18 to the pocket 7. Thus, at worst, the pocket width 24 would only be a fraction of a reduced wale width oversized, and this minimal dimension would not inhibit the pocket 7 from snugly holding in place a plastic stay 8 inserted in a cooperating pocket 7.

While the method herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. In the manufacture of a knit shirt with an open collar during which a body of said collar is knit and a pocket for a plastic stay is knit adjacent said opening of said collar, the improvement consisting of a method of matching the width sizes of said plastic stay and pocket comprising the steps of:

(1) using a plastic stay of approximately 0.375 inches in width;

(2) knitting a body of said collar in uniform wales of 0.10 inches in width; and (3) in a selected site adjacent an opening of said collar knitting onto said collar body a pocket in uniform wales of reduced 0.025 inches in width;

whereby optimally 14 wales' width of said pocket substantially matches said width of said plastic stay to contribute to snugly holding in place a plastic stay inserted in said pocket.

2. In the manufacture of a knit shirt with an open collar during which a body of said collar is knit and a pocket for a plastic stay is knit adjacent said opening of said collar, the improvement consisting of a method of matching the width sizes of said plastic stay and pocket comprising the steps of:

(1) using a plastic stay of a selected first width;

(2) knitting a body of said collar in uniform wales of a selected second width; and (3) in a selected site adjacent an opening of said collar knitting onto said collar body a pocket in uniform wales of a substantially reduced third width, said second and third selected widths being in the ratio of one to four;

whereby a number of optimally reduced wales' width of said pocket substantially matches said width of said plastic stay without any significant undersizing or oversizing therebetween.

*3. A knitted collar, comprising:*

*a knitted collar body having:*

*a sewing edge adapted to be attached to a shirt;*

*a finished edge; and*

*two selvedges;*

*said body having a pocket at each of said two selvedges, said pocket having an end and extending approximately from said finished edge to said sewing edge, said pocket being closed at said end by said finished edge; and*

*said pocket having a stitch density greater than a stitch density of a remainder of said collar body.*

*4. The knitted collar according claim 3, wherein said stitch density of said pocket is a multiple of said stitch density of said remainder of said collar body.*

*5. The knitted collar according claim 4, wherein said stitch density of said pocket is four times said stitch density of said remainder of said collar body.*

*6. The knitted collar according claim 5, wherein:*

*said stitch density of said pocket is approximately* 20 wales per ½ inch; and

*said stitch density of said remainder of said collar is approximately* 5 wales per ½ inch.

*7. A knitted collar, comprising:*

*a knitted collar body having:*

*a sewing edge adapted to be attached to a shirt;*

*a finished edge;*

*two selvedges; and*

*a pocket at each of said two selvedges extending approximately from said finished edge to said sewing edge, said pocket having:*

*a first end and a second end;*

*a first width; and*

*a stitch density greater than a stitch density of a remainder of said collar body, said pocket being closed at said first end by said finished edge;*

*a stay disposed in said pocket of each of said two selvedges, said stay having:*

*a second width;*

*a first end facing said first end of said pocket; and*

*a second end facing said second end of said pocket; and*

*said first width being substantially equal to said second width to snugly hold said stay in said pocket.*

*8. A shirt, comprising:*

*a shirt body; and*

*a knitted collar, including:*

*a knitted collar body having:*

*a sewing edge adapted to be attached to a shirt;*

*a finished edge; and*

*two selvedges;*

*said body having a pocket at each of said two selvedges, said pocket having an end and extending approximately from said finished edge to said sewing edge, said pocket being closed at said end by said finished edge; and*

*said pocket having a stitch density greater than a stitch density of a remainder of said collar body.*

*9. A shirt, comprising:*

*a shirt body; and*

*a knitted collar, including:*

*a knitted collar body having:*

*a sewing edge adapted to be attached to a shirt;*

*a finished edge; and*

*two selvedges;*

*a pocket at each of said two selvedges extending approximately from said finished edge to said sewing edge, said pocket having:*

*a first end and a second end;*

*a first width;*

*a stitch density greater than a stitch density of a remainder of said collar body, said pocket being closed at said first end by said finished edge; and*

*a stay disposed in said pocket of each of said two selvedges, said stay having:*

*a second width;*

*a first end facing said first end of said pocket; and*

*a second end facing said second end of said pocket; and*

*said first width being substantially equal to said second width to snugly hold said stay in said pocket.*

*10. A method for manufacturing a knitted collar, which comprises:*

*knitting a collar body with a first stitch density;*

*forming at least one pocket of the collar body with a second stitch density during knitting of the collar body, the second stitch density being greater than the first stitch density; and*

*inserting a stay into the pocket.*

*11. The method according to claim 10, wherein the stay is inserted into the pocket before knitting of the collar body is finished.*

*12. The method according to claim 10, wherein the second stitch density is a multiple of the first stitch density.*

*13. The method according to claim 10, which further comprises selecting the second stitch density to be a multiple of the first stitch density.*

*14. The method according to claim 12, wherein the second stitch density is four times the first stitch density.*

*15. The method according to claim 14, wherein:*

*the second stitch density is approximately* 20 wales per ½ inch; and

*the first stitch density is approximately* 5 wales per ½ inch.

*16. The method according claim 10, wherein the at least one pocket is a pocket at each selvedge of the collar body.*

*17. A method for manufacturing a knitted collar to receive a stay, which comprises:*

*knitting a collar body with a first stitch density; and*

*forming at least one pocket of the collar body with a second stitch density during knitting of the collar body, the second stitch density being greater than the first stitch density, and adjusting a width of the pocket by changing a number of wales for the pocket to approximately match a width of the stay to be inserted into the pocket.*

*18. A method for manufacturing a knitted collar, which comprises:*

*providing at least one stay having a width;*

*knitting a collar body with a first stitch density;*

*forming at least one pocket of the collar body with a second stitch density during knitting of the collar body, the second stitch density being greater than the first stitch density, and adjusting a width of the pocket by changing a number of wales for the pocket to approximately match the width of the stay; and*

*snugly inserting the stay into the pocket.*

* * * * *